(12) United States Patent
Kim et al.

(10) Patent No.: US 10,716,433 B2
(45) Date of Patent: Jul. 21, 2020

(54) COOKING APPARATUS

(71) Applicant: SAMSUNG ELECTRONICS CO., LTD., Suwon-si, Gyeonggi-do (KR)

(72) Inventors: Jin O Kim, Seoul (KR); Jee Yong Kim, Suwon-si (KR); Min-Gyu Jung, Yongin-si (KR); Ki Du Kim, Suwon-si (KR); Ah Hyun Bae, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 15/444,497

(22) Filed: Feb. 28, 2017

(65) Prior Publication Data

US 2017/0245680 A1 Aug. 31, 2017

(30) Foreign Application Priority Data

Feb. 29, 2016 (KR) ........................ 10-2016-0024230

(51) Int. Cl.
*H05B 6/64* (2006.01)
*H05B 6/76* (2006.01)
(Continued)

(52) U.S. Cl.
CPC .............. *A47J 36/36* (2013.01); *A47J 27/002* (2013.01); *A47J 36/02* (2013.01); *H05B 6/6414* (2013.01);
(Continued)

(58) Field of Classification Search
CPC .......... A47J 27/002; A47J 36/02; A47J 36/36; H05B 6/766; H05B 6/763; H05B 6/6414; H05B 2214/04
(Continued)

(56) References Cited

U.S. PATENT DOCUMENTS 5,206,478 A * 4/1993 Lee ........................ H05B 6/763
174/382
5,981,927 A * 11/1999 Osepchuk .............. H05B 6/766
126/198
(Continued)

FOREIGN PATENT DOCUMENTS

CN 101081144 12/2007
CN 101597143 12/2009
(Continued)

OTHER PUBLICATIONS

Form PCT/ISA/210; International Search Report dated May 23, 2017 in related International Patent Application No. PCT/KR2017/002220 (3 pages).
(Continued)

*Primary Examiner* — Quang T Van
(74) *Attorney, Agent, or Firm* — Staas & Halsey LLP (57) ABSTRACT

Disclosed herein are a cooking apparatus including a main body including a cooking compartment configured to cook food using microwaves, and a door configured to open or close the cooking compartment, wherein the door includes a door frame in which an opening is formed so that the cooking compartment is visible therethrough, and a shielding plate including a substrate and a multi-shielding layer, with which the substrate is coated to prevent microwaves in the cooking compartment from leaking to an outside, and coupled at the opening. The door of the cooking apparatus allows an inside of the cooking compartment to be better seen from the outside.

18 Claims, 10 Drawing Sheets

(51) Int. Cl.
   *A47J 36/36*  (2006.01)
   *A47J 27/00*  (2006.01)
   *A47J 36/02*  (2006.01)

(52) U.S. Cl.
   CPC .............. *H05B 6/763* (2013.01); *H05B 6/766* (2013.01); *H05B 2214/04* (2013.01)

(58) Field of Classification Search
   USPC ....... 219/756, 739, 738, 740, 741, 742, 743, 219/744; 174/35 R, 35 MS, 35 GC, 386, 174/389; 126/198, 200
   See application file for complete search history.

(56) References Cited

U.S. PATENT DOCUMENTS

| | | | |
|---|---|---|---|
| 7,053,348 B1 * | 5/2006 | Terada | H05B 6/763 126/198 |
| 2004/0164075 A1 | 8/2004 | Henze et al. | |
| 2004/0253471 A1 | 12/2004 | Thiel et al. | |
| 2006/0118553 A1 | 6/2006 | Terada et al. | |
| 2007/0271847 A1 | 11/2007 | Chin | |
| 2009/0142602 A1 | 6/2009 | Medwick et al. | |

FOREIGN PATENT DOCUMENTS

| | | | |
|---|---|---|---|
| CN | 201383886 Y | | 1/2010 |
| CN | 101785360 | | 7/2010 |
| JP | 2008060015 A | * | 3/2008 |
| KR | 10-2004-0090786 | | 10/2004 |
| KR | 10-2007-0000260 | | 1/2007 |
| KR | 10-2010-0012243 | | 2/2010 |
| KR | 10-2014-0014430 | | 2/2014 |
| KR | 10-2014-0063241 | | 5/2014 |
| WO | WO 2015/145355 A1 | | 10/2015 |

OTHER PUBLICATIONS

Extended European Search Report dated Dec. 3, 2018 in corresponding European Patent Application No. 17760301.6.
Chinese Office Action dated Jun. 27, 2019 in corresponding Chinese Patent Application No. 201780012499.X.
Chinese Office Action dated Dec. 19, 2019 from Chinese Patent Application No. 201780012499.X, 17 pages.

* cited by examiner

COOKING APPARATUS

CROSS-REFERENCE TO RELATED APPLICATION

This application claims the benefit of Korean Patent Application No. 10-2016-0024230, filed on Feb. 29, 2016 in the Korean Intellectual Property Office, the disclosure of which is incorporated herein by reference.

BACKGROUND

1. Field

Embodiments of the present disclosure relate to a cooking apparatus configured to cook food using microwaves, and more particularly, to a cooking apparatus having a door configured to simultaneously prevent leakage of microwaves and have improved visibility of an inside of a cooking compartment from an outside.

2. Description of the Related Art

A cooking apparatus is an apparatus configured to heat and cook food and includes an electric oven, a gas oven, a gas range, a microwave oven, an induction range, or a multifunctional hybrid oven range in which various functions are combined.

A microwave oven radiates microwaves toward food to cause molecules of the food to perform a kind of rotational motion and cooks the food using frictional heat due to the rotational motion. The microwave oven is advantageous in that food is heated within a short time, it has high thermal efficiency, and it is easy use because a surface of the food is not burned.

The microwave oven includes a cooking compartment including a front provided to be opened for inserting or withdrawing food and configured to cook the food using microwaves and a door configured to open or close the open front of the cooking compartment and prevent microwaves in the cooking compartment from leaking to the outside. Generally, the door of the microwave oven includes a perforated plate in which a plurality of holes are perforated on a metallic substrate to prevent microwaves from leaking and secure visibility of an interior of the cooking compartment from an outside.

However, the perforated metal plate has a structural limitation to secure visibility. For example, the perforated metal plate provides just enough visibility to determine whether there is food in the cooking compartment. Accordingly, there is an inconvenience in opening the door and checking an inside to determine a cooking state of food and the like in detail, and heat in the cooking compartment being leaked to the outside and causing energy consumption and a danger of being burned or the like when the door is opened.

SUMMARY

Therefore, it is an aspect of the present disclosure to provide a cooking apparatus having a door with improved visibility of an inside of a cooking compartment from the outside.

It is another aspect of the present disclosure to provide a cooking apparatus having a door configured to prevent microwaves in a cooking compartment from leaking to the outside.

It is still another aspect of the present disclosure to provide a cooking apparatus having a door with improved heat resistance and energy efficiency.

Additional aspects of the disclosure will be set forth in part in the description which follows and, in part, will be apparent from the description, or may be learned by practice of the disclosure.

In accordance with one aspect of present disclosure, a cooking apparatus includes: a main body including a cooking compartment configured to cook food using microwaves; and a door configured to open or close the cooking compartment, wherein the door includes: a door frame in which an opening is formed so that the cooking compartment is visible therethrough; and a shielding plate including a substrate and a multi-shielding layer, with which the substrate is coated to prevent microwaves in the cooking compartment from leaking to an outside, and coupled to the opening.

The substrate may be made of a glass or plastic material to be seen through.

The multi-shielding layer may include a main shielding layer made of a metal configured to conduct microwaves.

The multi-shielding layer may include an insulating layer stacked between the substrate and the main shielding layer.

The multi-shielding layer may include a base layer stacked between the insulating layer and the main shielding layer to adhere the insulating layer to the main shielding layer.

The multi-shielding layer may include a protective layer stacked at a position farthest from the substrate.

The multi-shielding layer may include a buffer layer stacked between the main shielding layer and the protective layer.

The main shielding layer may include at least one material among Ag, Cu, stainless steel, Ni, Cr, Ti, Au, and a carbon nanotube (CNT).

The insulating layer may include at least one material among $TiO_2$, $Bi_2O_3$, and $SnO_2$.

The base layer may include ZnO.

The protective layer may include at least one material among $Si_2N_4$ and $SnO_2$.

The buffer layer may include at least one material among Ni, Cr, and Ti.

In accordance with one aspect of present disclosure, a cooking apparatus includes: a main body including a cooking compartment configured to cook food using microwaves; and a door configured to open or close the cooking compartment, wherein the door includes: a door frame having an opening through which the cooking compartment is visible and a choke formed at an edge of the door frame to offset microwaves; a shielding plate including a substrate and a shielding layer, with which the substrate is coated to prevent microwaves in the cooking compartment from leaking to an outside, and coupled to the opening; and a fixing member configured to fix the shielding plate to the door frame.

The fixing member may include a conductive adhesive member configured to adhere the door frame to the shielding plate and transmit microwaves conducted by the shielding plate to the door frame.

The fixing member may include a mounting member coupled to the door frame, a support configured to support the shielding plate, and a cover member having a coupler coupled to the mounting member.

The cooking apparatus may further include a coupling member configured to couple the mounting member to the cover member.

The fixing member may include a supporting member having a first support supported by the door frame and a second support configured to support the shielding plate, and an elastic coupling member configured to couple the shielding plate to the second support using an elastic force.

The elastic coupling member may include a first clamp and a second clamp formed to face each other to surround the shielding plate and the second support, and the first clamp and the second clamp may be elastically biased in a closing direction.

The door may include a front panel coupled to a front portion of the door frame, a rear panel coupled to a rear portion of the door frame; and an auxiliary glass member disposed behind the shielding plate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Since the embodiments described in this specification are only exemplary embodiments and do not represent the overall technological scope of the disclosure, it should be understood that the disclosure covers various equivalents, modifications, and substitutions at the time of filing of this application.

The same reference numbers will be used to refer to the same or like parts in the drawings, and the drawings may be enlarged or exaggerated to facilitate an easy understanding the present disclosure.

Unless otherwise defined in the present specification, all terms (including technical and scientific terms) used herein are to be interpreted as is customary in the art to which this disclosure belongs.

However, terms specifically referred to in this specification are not to be interpreted as limited to commonly used meanings or meanings in dictionaries and should be interpreted as having meanings and concepts which are consistent with the technological scope of the disclosure based on the principle that the inventor has appropriately defined concepts of terms in order to describe the disclosure in the best way.

While terms such as the ordinal numbers "first," "second," etc. may be used to describe various elements, such elements are not limited by these terms. That is such terms are used only to distinguish one element from another.

Elements of the disclosure referred to in singular may number one or more unless clearly indicated otherwise by context.

It should be further understood that the terms "comprise," "comprising," "include," and/or "including" specify the presence of stated features, numbers, steps, operations, elements, components, and/or groups thereof when used herein, but do not preclude the presence or addition of one or more other features, numbers, steps, operations, elements, components, and/or groups thereof.

When a component is provided "in front of," "behind," "above," "below," "on the left of," or "on the right of" another component, a case in which the component is provide "in front of," "behind," "above," "below," "on the left of," or "on the right of" another component is not solely being referenced and a case in which a third component is interposed therebetween is included.

Hereinafter an exemplary embodiment of the present disclosure will be described in detail with reference to the accompanying drawings.

Figure 1:
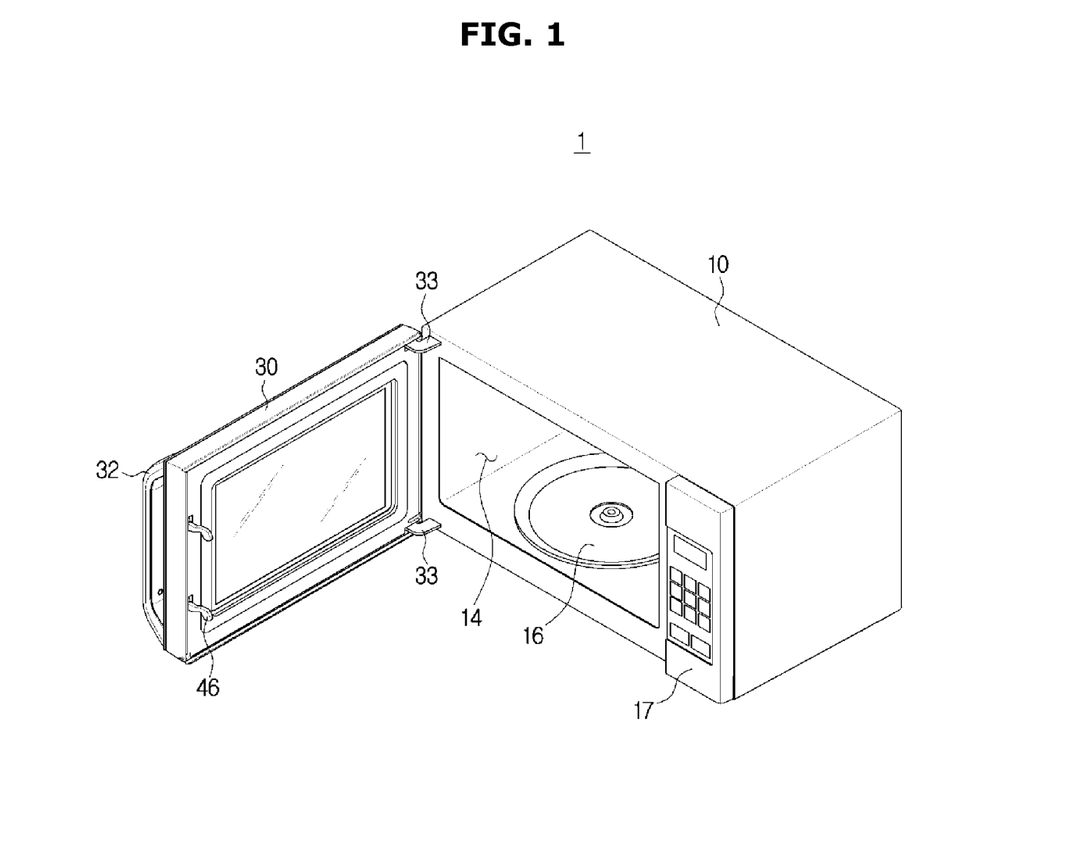
FIG. 1 is a perspective view illustrating a cooking apparatus according to one embodiment of the present disclosure.
Figure 2:
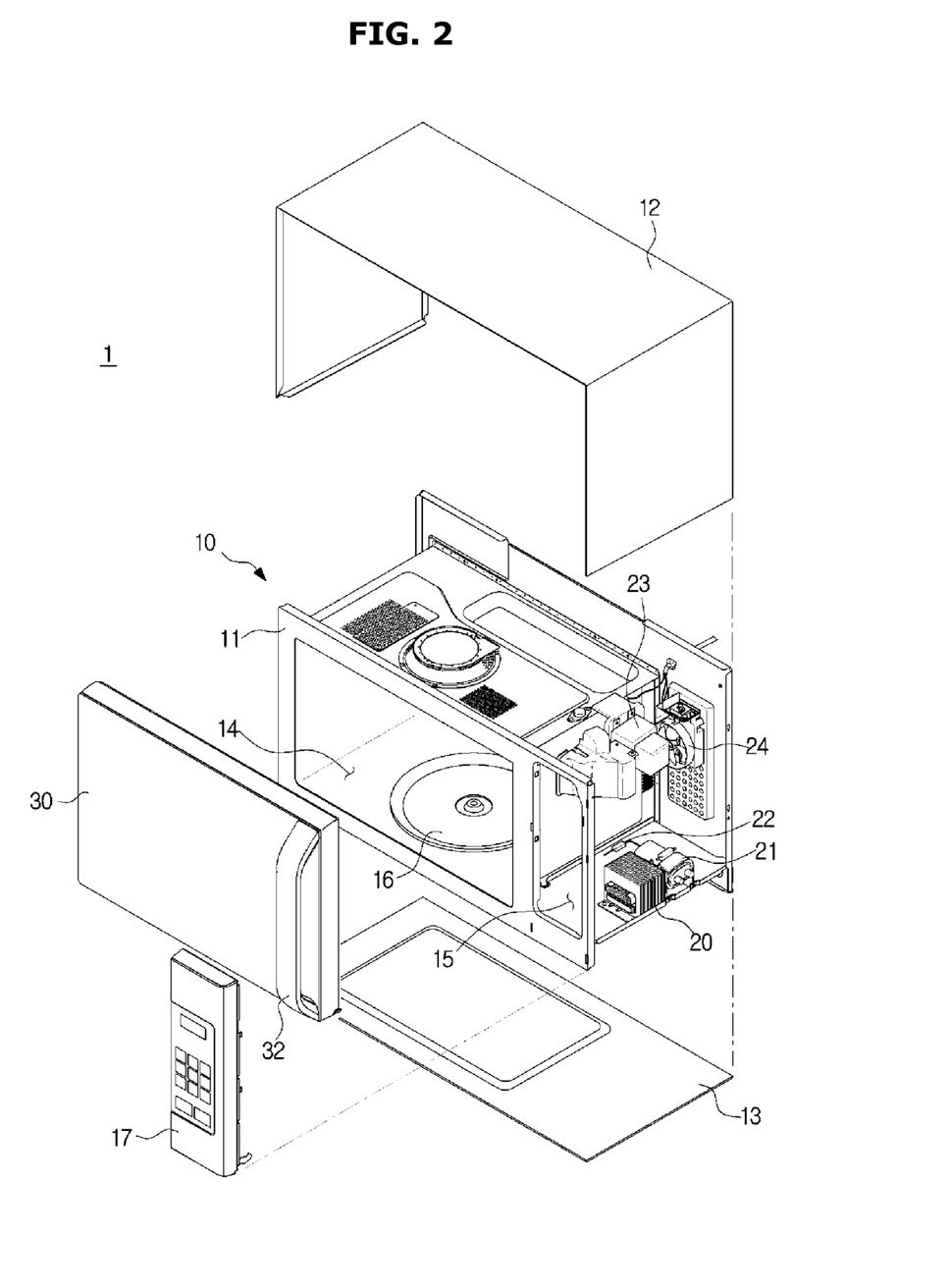
FIG. 2 is an exploded view illustrating a detailed configuration of the cooking apparatus illustrated in FIG. 1.

FIG. 1 is a perspective view illustrating a cooking apparatus according to one embodiment of the present disclosure. FIG. 2 is an exploded view illustrating a detailed configuration of the cooking apparatus illustrated in FIG. 1.

Referring to FIGS. 1 to 2, a cooking apparatus 1 includes a main body 10 having a cooking compartment 14 configured to cook food using microwaves and an electric component compartment 15 in which various electric components are accommodated, and a door 30 coupled to a front of the main body 10.

The main body 10 may include a main frame 11, an upper cover 12 coupled to an upper portion of the main frame 11, and a lower cover 13 coupled to a lower portion of the main frame 11.

The cooking compartment 14 may include a front configured to be opened so that food may be inserted or withdrawn, and the open front may be opened or closed by the door 30. The door 30 may be rotatably coupled to the main body 10 by a hinge member 33. A handle 32 configured to be gripped by a hand to open or close the door 30 and a locking device 46 configured to maintain a closed state of the door 30 may be provided at a side opposite the hinge member 33

A tray 16 on which food may be put is provided in the cooking compartment 14, and the tray 16 may be rotatable during cooking. A control panel 17 which displays various types of cooking information of the cooking apparatus 1 and through which various commands are input to the cooking apparatus 1 may be provided on a front surface of the main body 10. The control panel 17 may include a display such as a liquid crystal display and an input such as a button, a knob, and a touch panel.

The electric component compartment 15 is provided to be divided from the cooking compartment 14, and the electric component compartment 15 may accommodate various electric components configured to radiate microwaves into the cooking compartment 14.

A magnetron 23 configured to generate high frequency microwaves which are radiated into the cooking compartment 14, and a high voltage transformer 20, a high voltage condenser 21, a high voltage diode 22, and the like forming a driving circuit configured to drive the magnetron 23 may be disposed in the electric component compartment 15. In addition, a cooling fan 24 configured to cool the various electric components in the electric component compartment 15 may be provided in the electric component compartment 15.

The high voltage transformer 20 may receive a commercial AC power of 110 V or 220 V and output a high voltage of approximately 2,000 V. The output voltage is boosted to approximately 4,000 V by the high voltage condenser 21 and high voltage diode 22 and supplied to the magnetron 23, and the magnetron 23 may generate high frequency microwaves of approximately 2,450 MHz.

Microwaves radiated by the magnetron 23 may collide with and be reflected by a wall surface of the cooking compartment 14, and as a result, be absorbed by food put on the tray 16. The microwaves absorbed by the food may cause water molecules included in the food to vibrate, and the food may be heated and cooked by frictional heat of the molecules which are generated due to the vibrations of the water molecules.

The door 30 of the cooking apparatus 1 may prevent microwaves in the cooking compartment 14 from leaking to the outside and allow an inside of the cooking compartment 14 to be visible from the outside. A detailed configuration of the door 30 will be described below in detail.

Figure 3:
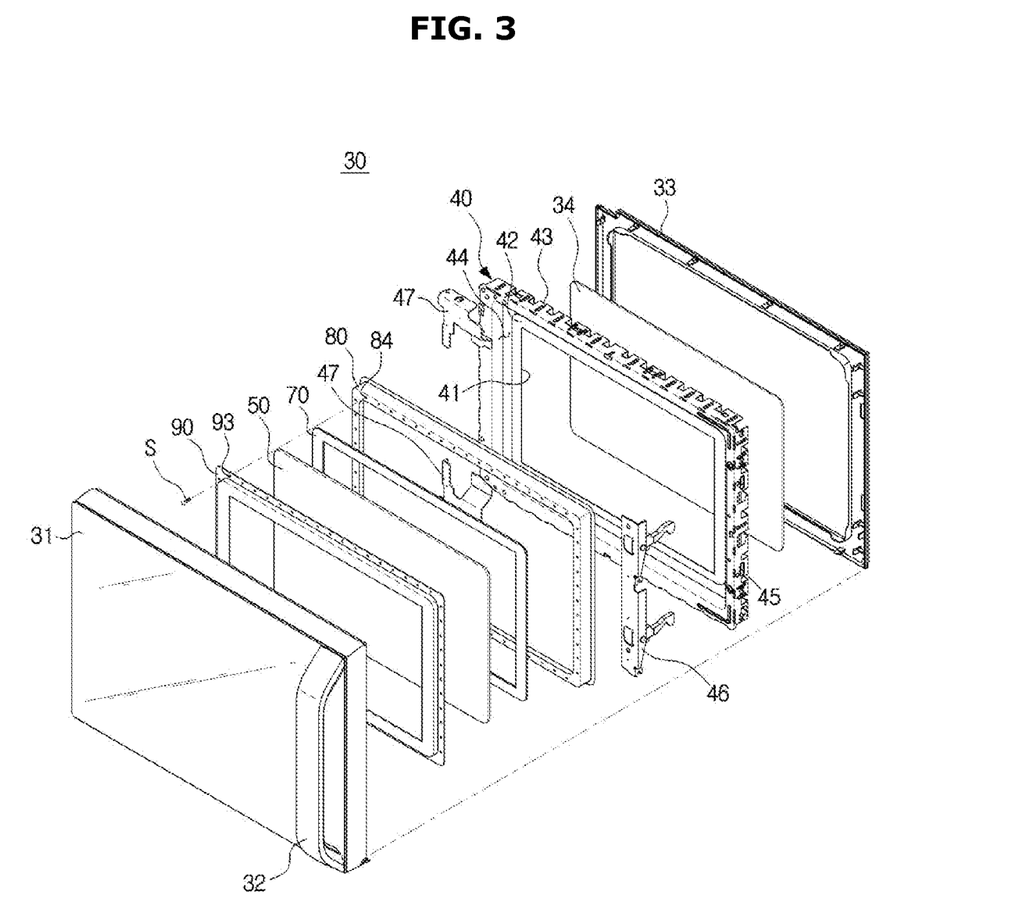
FIG. 3 is an exploded view illustrating a detailed configuration of a door of the cooking apparatus illustrated in FIG. 1.
Figure 4:
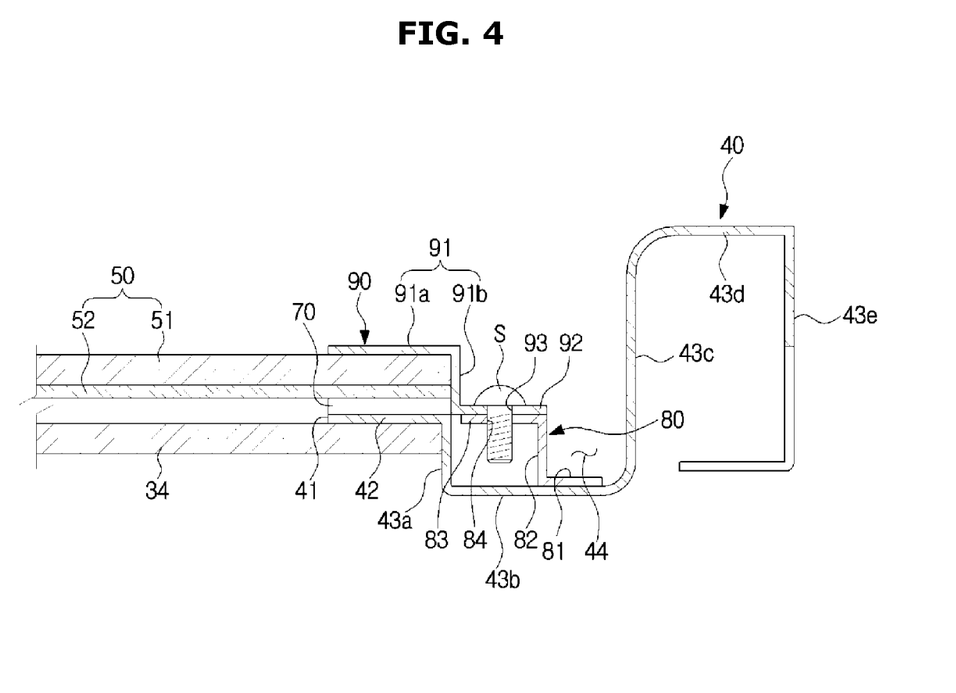
FIG. 4 is a cross-sectional view illustrating a coupling structure of a shielding plate and a door frame of the cooking apparatus illustrated in FIG. 1.
Figure 5:
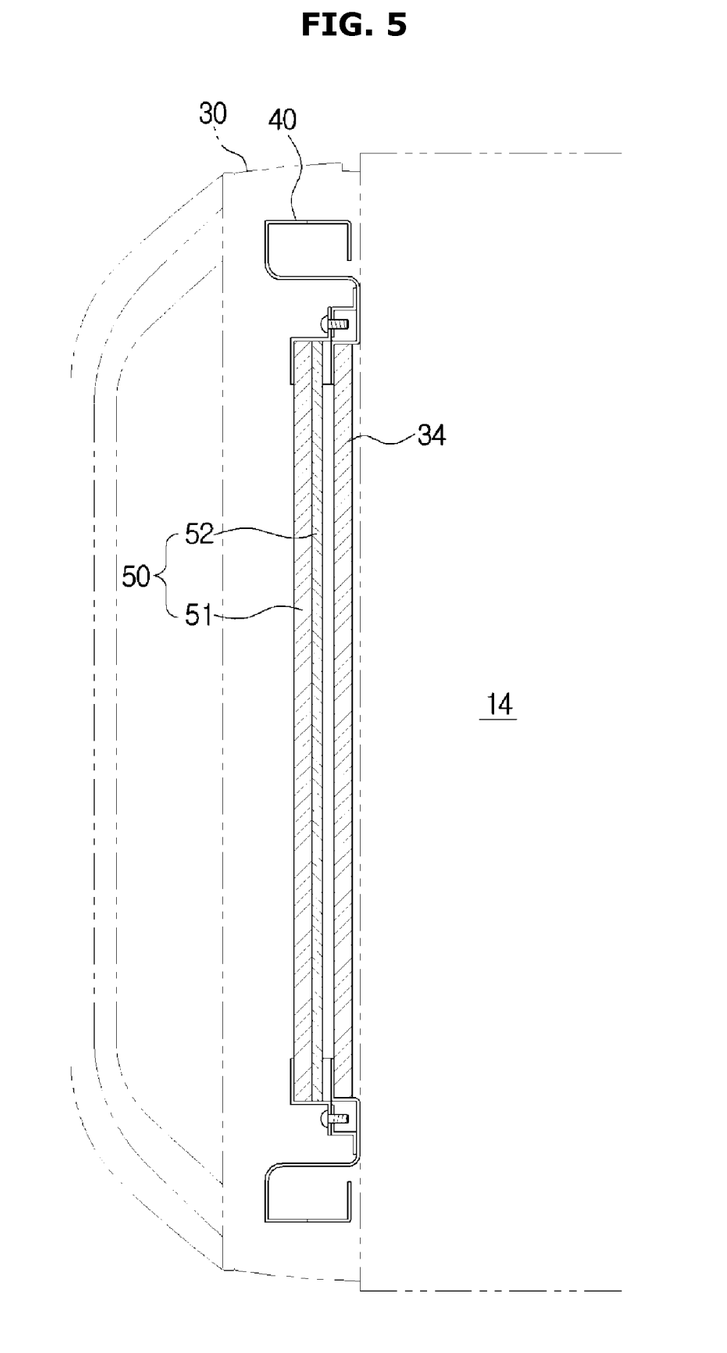
FIG. 5 is a schematic cross-sectional view illustrating the door and a cooking compartment of the cooking apparatus illustrated in FIG. 1.
Figure 6:
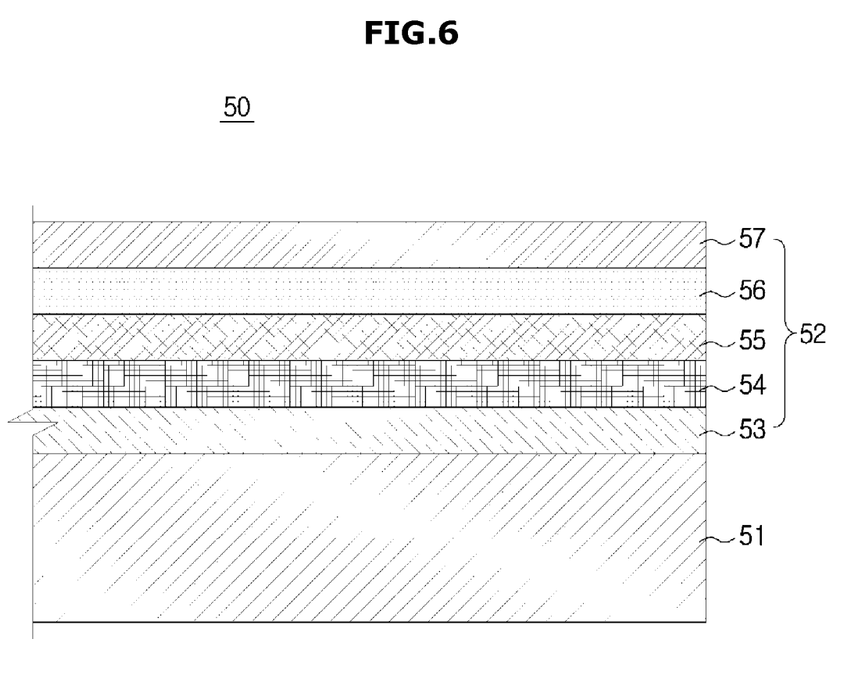
FIG. 6 is a view illustrating a stacked structure of the shielding plate of the cooking apparatus illustrated in FIG. 1.
Figure 7:
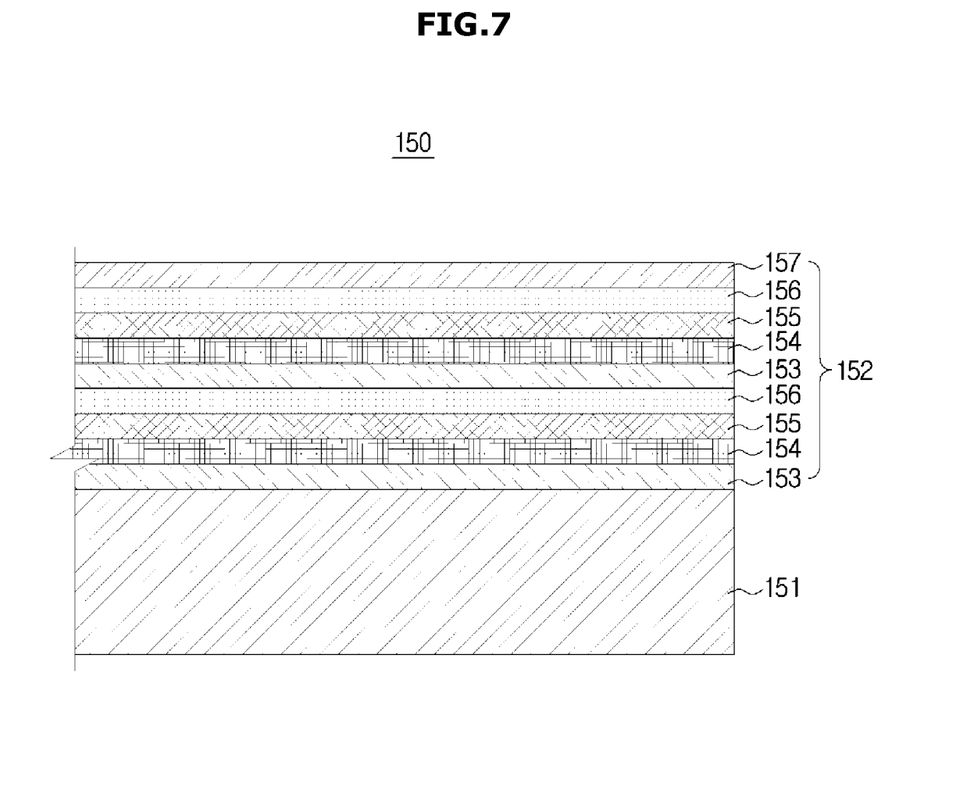
FIG. 7 is a view illustrating a stacked structure of a shielding plate of the cooking apparatus illustrated in FIG. 1 according to another embodiment.
Figure 8:
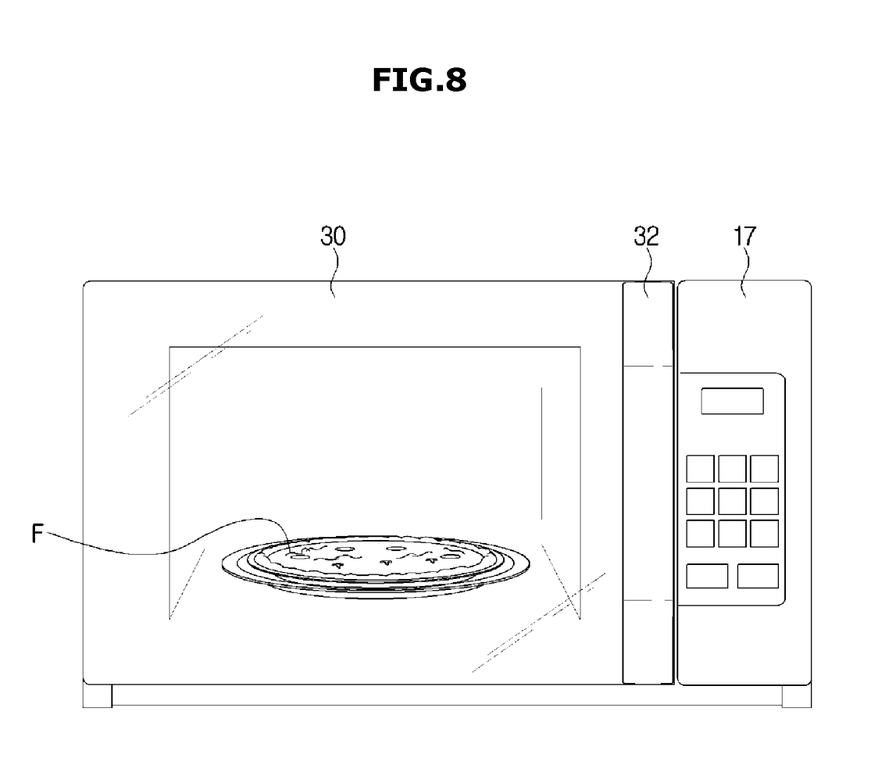
FIG. 8 is a view illustrating a state in which an inside of the cooking compartment is seen through the door of the cooking apparatus illustrated in FIG. 1.

FIG. 3 is an exploded view illustrating a detailed configuration of a door of the cooking apparatus illustrated in FIG. 1. FIG. 4 is a cross-sectional view illustrating a coupling structure of a shielding plate and a door frame of the cooking apparatus illustrated in FIG. 1. FIG. 5 is a schematic cross-sectional view illustrating the door and a cooking compartment of the cooking apparatus illustrated in FIG. 1. FIG. 6 is a view illustrating a stacked structure of the shielding plate of the cooking apparatus illustrated in FIG. 1. FIG. 7 is a view illustrating a stacked structure of a shielding plate of the cooking apparatus illustrated in FIG. 1 according to another embodiment. FIG. 8 is a view illustrating a state in which an inside of the cooking compartment is seen through the door of the cooking apparatus illustrated in FIG. 1

Referring to FIGS. 3 to 8, the door 30 may include a front panel 31 forming a front exterior, a door frame 40 forming a frame of the door 30 and including an opening (as the frame of the door) 41 so that the inside of the cooking compartment 14 is visible from the outside, a shielding plate 50 coupled to the opening 41 to prevent microwaves in the cooking compartment 14 from leaking to the outside, and a rear panel 33 coupled to a rear portion of the door frame 40.

The front panel 31 may be made of a transparent or translucent plastic material. The handle 32 that may be gripped by a hand to open or close the door 30 may be provided at one side of the front panel 31.

The door frame 40 may be integrally formed by performing a pressing process on a metal plate, and may include a base 42 forming the opening 41 and a choke 43 configured to offset and eliminate microwaves conducted by the shielding plate 50 to the door frame 40.

The choke 43 may include a plurality of bent portions 43a to 43f formed by sequentially bending the base 42 from an outer side thereof. A channel 44 opening toward the front panel 31 is formed by the bent portions 43a to 43c, and the bent portion 43c and the bent portion 43f may be provided to have a predetermined distance therebetween.

In addition, the choke 43 includes a plurality of incised grooves 45 formed to have a predetermined distance in directions of long and short sides thereof. The choke 43 may offset and eliminate microwaves with a predetermined bandwidth leaked from the inside of the cooking compartment 14 using a relation of frequency resonance.

The hinge member 33 (see FIG. 1) may be coupled to one side of the door frame 40, and a reinforcement member 47 configured to reinforce a coupling force of the hinge member 33 and the door frame 40 may be provided. The locking device 46 configured to maintain the closed state of the door 30 may be coupled to a side opposite the door frame 40

The shielding plate 50 may be formed by coating a substrate 51 with a multi-shielding layer 52 to provide a substantially or uniformly transparent or translucent or clear surface (without any or substantial perforation). The substrate 51 may be made of a transparent or translucent glass or plastic material that may be looked through, and the multi-shielding layer 52 may include a plurality of layers made of different materials to improve leakage prevention of microwaves and other performance.

For example, as illustrated in FIG. 6, the multi-shielding layer 52 may be formed by sequentially stacking an insulating layer 53, a base layer 54, a main shielding layer 55, a buffer layer 56, and a protective layer 57 on the substrate 51

The insulating layer 53 may be provided to insulate electricity and heat, and may include, for example, at least one (any one or combination of) of titanium oxide ($TiO_2$), bismuth oxide ($Bi_2O_3$), and tin oxide ($SnO_2$).

The base layer 54 may be provided to improve adhesive performance of the insulating layer 53 and the main shielding layer 55, and the base layer may include, for example, zinc oxide (ZnO).

The main shielding layer 55 may be provided to conduct and/or reflect microwaves to substantially block the microwaves, and may be made of a metal. For example, the main shielding layer 55 may be made of at least one (any one or combination of) material among silver (Ag), copper (Cu), stainless steel, nickel (wNi), chrome (Cr), titanium (Ti), and gold (Au). In addition, the main shielding layer 55 may also include an alloy of the above metals or a carbon nanotube (CNT) having excellent conductivity.

The buffer layer 56 may be provided to prevent the shielding plate 50 from bending or a defect from occurring between deposited layers due to a mechanical force such as stress and strain being applied to the shielding plate 50. For example, the buffer layer 56 may be made of at least one (any one or combination of) material among nickel (Ni), chrome (Cr), and titanium (Ti).

The protective layer 57 may be stacked at a position farthest from the substrate 51 to protect the multi-shielding layer 52, and may include, for example, at least one (any one or combination of) material between $Si_2N_4$ and tin oxide ($SnO_2$).

The substrate 51 may be coated with each layer through various methods. For example, the substrate 51 may be coated with each layer through methods such as vacuum sputtering, vacuum evaporation, and spin coating.

That is, after forming a vacuum in a chamber through vacuum sputtering, the substrate 51 may be coated with each layer by applying a direct or alternating current thereto and radiating atoms while plasma of a gas collides with a target material mounted on a cathode.

Alternatively, the substrate may be coated with a sputtering target material by heating the material in a high vacuum state at a high temperature to evaporate the material. Here, a stacking thickness may be adjusted by adjusting an evaporation temperature of the material.

However, the spirit of the present disclosure is not limited to such deposition methods, and the multi-shielding layer 52 may be formed on the substrate 51 through various known technologies.

Such a stacked structure may be variously modified by those skilled in the art within a range. A thickness or the like of each layer is also not limited.

Some layers may be repeated in the same sequence, and performance may also be improved by adjusting a thickness of each layer. In addition, thermal treatment or additional coating such as hard coating may also be performed to improve performance.

For example, as illustrated in FIG. 7, the multi-shielding layer 152 of the shielding plate 150 may be formed by stacking the insulating layer 153, the base layer 154, the main shielding layer 155, and the buffer layer 156 on the substrate 151, then repeatedly stacking the insulating layer 153, the base layer 154, the main shielding layer 155, and the buffer layer 156 thereon, and finally stacking the protective layer 157 thereon.

Since microwaves radiated from the inside of the cooking compartment 14 are conducted to the door frame 40 by the shielding plate 150 and offset and eliminated at the choke 43 of the door frame 40, the microwaves may be prevented from leaking to the outside.

The shielding plate 50 (or 150 as the case may be) may be coupled to the opening 41 of the door frame 40 such that the substrate 51 faces the front panel 31 and the multi-shielding layer 52 faces the cooking compartment 14. However, conversely, the shielding plate 50 (or 150 as the case may be) may also be coupled to the opening 41 of the door frame 40 such that the substrate 51 faces the cooking compartment 14 and the multi-shielding layer 52 faces the front panel 31.

Since such a shielding plate 50 is formed by coating the substrate 51 made of a glass or plastic material that may be looked through with the multi-shielding layer 52 configured to conduct and/or reflect microwaves to substantially block leakage of the microwaves while visibility, by which the inside of the cooking compartment is visible, may be improved while performance of microwaves leakage prevention is maintained compared to a conventional perforated metal plate.

That is, as illustrated in FIG. 8, a cooking state of food F in the cooking compartment may be seen in detail through the door 30 from the outside of the cooking compartment, and thus the door 30 is not needed to be opened to determine the state of the food.

In addition, since a conventional perforated metal plate is not used, a manufacturing cost of the door 30 may be decreased. In addition, since the multi-shielding layer 52 includes the insulating layer 53 and the protective layer 57 configured to insulate electricity and heat, the multi-shielding layer 52 may better withstand a high temperature, and since leakage of heat in the cooking compartment 14 is reduced, energy efficiency can be improved.

In the embodiment of the present disclosure, the door 30 may include a fixing member configured to couple the shielding plate 50 to the door frame 40 while minimizing processing for the substrate 51 made of a glass or plastic material and effectively transmitting microwaves conducted by the shielding plate 50 to the door frame 40.

The fixing member includes a conductive adhesive member 70 configured to adhere the door frame 40 to the shielding plate 50 and be adhered to the door frame 40 and the shielding plate 50 to transmit microwaves conducted by the shielding plate 50 to the door frame 40.

The conductive adhesive member 70 may be a type of conductive double-sided tape, and may be adhered to sides of the door frame 40 and the shielding plate 50 which face each other.

The fixing member may include a mounting member 80 coupled to the door frame 40 and a cover member 90 coupled to the mounting member 80 to support the shielding plate 50. As illustrated in FIG. 4, the mounting member 80 may be provided to be accommodated in the channel 44 of the door frame 40.

The mounting member 80 may include a door frame support 81 supported by the door frame 40, a connector 82 formed by a portion of the door frame support 81 being bent, and a first coupler 83 formed by a portion of the connector 82 being bent and coupled to the cover member 90. The door frame support 81 and the first coupler 83 may form a step and be parallel to each other.

The door frame support 81 may be coupled to the door frame 40 by a separate coupling member S, such as a pin, a screw, a rivet, and a fixing piece or an adhesive member such as a silicone adhesive or a double-sided adhesive tape.

The cover member 90 may include a shielding plate support 91 configured to support the shielding plate 50 and a second coupler 92 provided to be coupled to the first coupler 83. The shielding plate support 91 and the second coupler 92 may be integrally formed.

The shielding plate support 91 may include a shielding plate front support 91a configured to support a front surface of the shielding plate 50 and a shielding plate side support 91b formed by a portion of the shielding plate front support 91a being bent to support a side surface of the shielding plate 50.

The first coupler 83 and the second coupler 92 may be firmly coupled by a coupling member S which is provided separately. To this end, a coupling hole 84 to which the coupling member S is coupled may be formed in the first coupler 83, and a through hole 93 through which the coupling member S passes may be formed in the second coupler 92.

A procedure for coupling the shielding plate 50 to the door frame 40 using the fixing member will be described below.

First, the shielding plate 50 is temporarily fixed to the door frame 40 using the conductive adhesive member 70, the mounting member 80 is coupled to the door frame 40, and the cover member 90 is finally coupled to the mounting member 80.

Such a fixing structure has effects in that additional processing for the shielding plate 50 is not needed for assembly, and thus the assembly is simplified and the shielding plate 50 and the like are prevented from being damaged during assembly.

The door 30 may further include an auxiliary glass member 34 positioned behind the shielding plate 50. The auxiliary glass member 34 may be coupled to the door frame 40. The auxiliary glass member 34 may be made of a transparent or translucent glass or plastic material that may be looked through.

The auxiliary glass member 34 may be provided between the shielding plate 40 and the cooking compartment 14 to prevent moisture, gas, other contaminants, and the like in the cooking compartment 14 from leaking to the outside.

Figure 9:
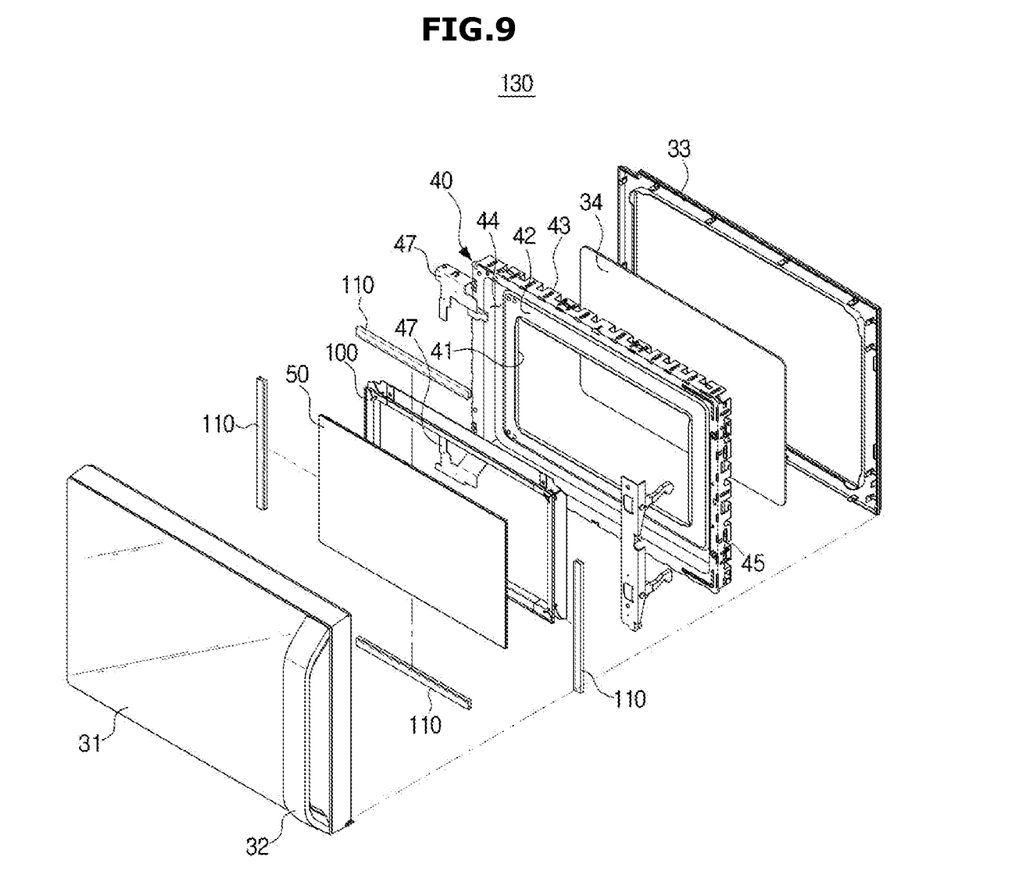
FIG. 9 is an exploded view illustrating a door of the cooking apparatus according to another embodiment of the present disclosure.
Figure 10:
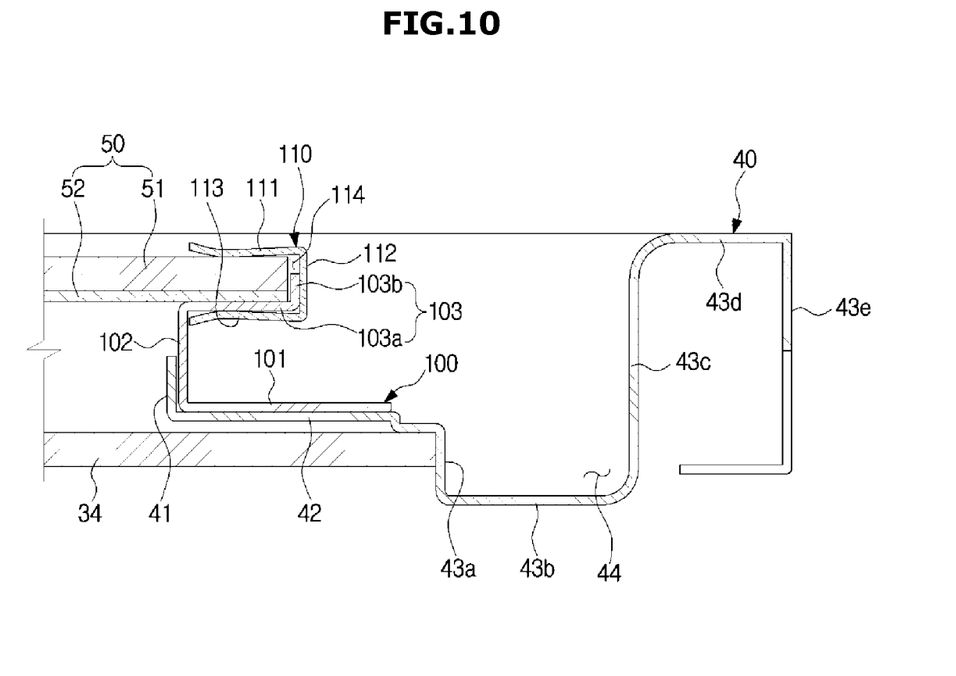
FIG. 10 is a cross-sectional view illustrating a coupling structure of a shielding plate and a door frame of the cooking apparatus illustrated in FIG. 9.

FIG. 9 is an exploded view illustrating a door of a cooking apparatus according to another embodiment of the present disclosure. FIG. 10 is a cross-sectional view illustrating a coupling structure of a shielding plate and a door frame of the cooking apparatus illustrated in FIG. 9.

Referring to FIGS. 9 and 10, the coupling structure of the shielding plate and the door frame of the cooking apparatus according to another embodiment of the present disclosure will be described below. The same reference numerals will refer to the same components according the above-described embodiment in the drawings and the descriptions may be omitted.

A door 130 may include a front panel 31 forming a front exterior, a door frame 40 forming a frame of the door 130 and including an opening 41 so that an inside of a cooking compartment 14 is visible from the outside, a shielding plate 50 coupled to the opening 41 to prevent microwaves in the cooking compartment 14 from leaking to the outside, and a rear panel 33 coupled to a rear portion of the door frame 40.

The shielding plate 50 may include a substrate 51 made of a transparent or translucent glass or plastic material that may be looked through and a shielding layer 52 with which the substrate 51 is coated.

The door 130 may include a fixing member configured to couple the shielding plate 50 to the door frame 40 while minimizing processing for the substrate 51 made of a glass or plastic material and effectively transmitting microwaves conducted by the shielding plate 50 to the door frame 40.

The fixing member may include a supporting member 100 configured to support the shielding plate 50 and transmit microwaves conducted by the shielding plate 50 to the door frame 40 and an elastic coupling member 110 configured to couple the shielding plate 50 to the supporting member 100 using an elastic force.

The supporting member 100 may include a first support 101 supported by the door frame 40, a second support 103 configured to support the shielding plate 50, and a middle portion 102 configured to connect the first support 101 and the second support 103.

The first support 101, the middle portion 102, and the second support 103 may be integrally formed, and the first support 101 and the second support 103 may have a step and be parallel with each other.

The first support 101 may be coupled to the door frame 40 by a separate coupling member such as a pin, a screw, a rivet, and a fixing piece or an adhesive member such as a silicone adhesive or a double-sided adhesive tape.

The second support 103 may include a shielding plate rear support 103a configured to support a rear surface of the shielding plate 50 and a shielding plate side support 103b configured to support a side surface of the shielding plate 50.

The supporting member 100 may be made of a conductive material to transmit microwaves which were conducted by the shielding plate 50 to the door frame 40.

The elastic coupling member 110 may fix the shielding plate 50 by clamping the second support 103 and the shielding plate 50. The elastic coupling member 110 may have an approximately 'C' shape and be made of an elastically deformable material that can be opened or closed.

Specifically, the elastic coupling member 110 may include a first clamp 111 and a second clamp 113 formed to face each other to surround the shielding plate 50 and the second support 103, and an extension 112 configured to connect the first clamp 111 and the second clamp 113.

An accommodation portion 114 in which the shielding plate 50 and the second support 103 are accommodated may be formed between the first clamp 111 and the second clamp 113.

When the first clamp 111 and the second clamp 113 are opened to some extent, the shielding plate 50 and the second support 103 may enter and be accommodated in the accommodation portion 114. When the shielding plate 50 and the second support 103 are accommodated in the accommodation portion 114, the first clamp 111 and the second clamp 113 may be elastically biased in a closing direction.

Accordingly, since an elastic force is applied to the first clamp 111 and the second clamp 113 in the closing direction, the shielding plate 50 and the second support 103 may be fixed. At least one elastic coupling member 110 may be provided at each of a pair of long sides and short sides of the shielding plate 50. Alternatively, at least one elastic coupling member 110 may be provided only at the pair of long sides or short sides.

Due to a fixing structure of the supporting member 100 and the elastic coupling member 110, additional processing for the shielding plate 50 is not needed for assembly, and thus the assembly is simplified and the shielding plate 50 and the like are prevented from being damaged during assembly.

In addition, the shielding plate 50 can be easily separated from the door frame 40 by simply pulling and separating the elastic coupling member 110 therefrom.

As is apparent from the above description, visibility of an inside of a cooking compartment of a cooking apparatus through a door thereof can be improved so that a cooking state of food to be cooked or the like in the cooking compartment can be determined without opening the door.

In addition, a heat resistance of the door of the cooking apparatus can be improved and thermal leakage can be prevented to improve energy efficiency.

In addition, a manufacturing cost of the door of the cooking apparatus can be decreased.

What is claimed is:

1. A cooking apparatus comprising:
a main body including a cooking compartment to cook food by emitting microwaves; and
a door to open or close the cooking compartment,
wherein the door includes:
a door frame having an opening to the cooking compartment and a choke formed at an edge of the door frame to offset the emitted microwaves to the door frame, and
a shielding plate coupled to the door frame and positioned along the opening, the shielding plate including,
a substrate to provide visibility into the cooking compartment,
a transparent shielding layer formed on the substrate and conducting the emitted microwaves to the door frame to prevent the emitted microwaves in the cooking compartment from leaking outside the cooking compartment, and
a fixing member to fix the shielding plate to the door frame, wherein the fixing member includes:
a conductive adhesive member to adhere the door frame to the shielding plate and transmit the emitted microwaves conducted by the shielding plate to the door frame,
a mounting member coupled to the door frame, and
a cover member coupled to the mounting member to support the shielding plate.

2. The cooking apparatus of claim 1, wherein the substrate is made of a glass or plastic material to provide visibility into the cooking compartment.

3. The cooking apparatus of claim 1, wherein the shielding layer is multilayered and includes a microwave shielding layer made of a metal to conduct the emitted microwaves to the door frame.

4. The cooking apparatus of claim 3, wherein the shielding layer includes an insulating layer stacked between the substrate and the microwave shielding layer.

5. The cooking apparatus of claim 4, wherein the shielding layer includes a base layer stacked between the insulating layer and the microwave shielding layer to adhere the insulating layer to the microwave shielding layer.

6. The cooking apparatus of claim 5, wherein the base layer includes ZnO.

7. The cooking apparatus of claim 4, wherein the insulating layer includes any one or combination of materials among $TiO_2$, $Bi_2O_3$, and $SnO_2$.

8. The cooking apparatus of claim 3, wherein the shielding layer includes a protective layer, among layers of the shielding layer, stacked at a position farthest from the substrate.

9. The cooking apparatus of claim 8, wherein the shielding layer includes a buffer layer stacked between the microwave shielding layer and the protective layer.

10. The cooking apparatus of claim 9, wherein the buffer layer includes any one or combination of materials among Ni, Cr, and Ti.

11. The cooking apparatus of claim 8, wherein the protective layer includes any one or combination of materials between $Si_2N_4$ and $SnO_2$.

12. The cooking apparatus of claim 3, wherein the microwave shielding layer includes any one or combination of materials among Ag, Cu, stainless steel, Ni, Cr, Ti, Au, and a carbon nanotube (CNT).

13. A cooking apparatus comprising:
a main body including a cooking compartment to cook food by emitting microwaves; and
a door to open or close the cooking compartment, wherein the door includes:
a door frame having an opening to the cooking compartment and a choke formed at an edge of the door frame to offset the emitted microwaves to the door frame, and
a shielding plate coupled to the door frame and positioned along the opening, the shielding plate including,
a substrate to provide visibility into the cooking compartment, and
a transparent shielding layer formed on the substrate and conducting the emitted microwaves to the door frame to be offset by the choke to prevent the emitted microwaves in the cooking compartment from leaking outside the cooking compartment; and
a fixing member to fix the shielding plate to the door frame, wherein the fixing member includes:
a conductive adhesive member to adhere the door frame to the shielding plate and transmit the emitted microwaves conducted by the shielding plate to the door frame,
mounting member coupled to the door frame, and
a cover member coupled to the mounting member to support the shielding plate.

14. The cooking apparatus of claim 13,
the mounting member includes a door frame support to support the door frame, a first coupler provided to be coupled to the cover member, and a connector connecting the door frame support and the first coupler, and
a cover member includes a shielding plate support to support the shielding plate and a second coupler provided to be coupled to the first coupler.

15. The cooking apparatus of claim 14, further comprising a coupling member to couple the mounting member to the cover member.

16. The cooking apparatus of claim 13, wherein the fixing member includes:
a supporting member having a first support supported by the door frame and a second support to support the shielding plate; and
an elastic coupling member to couple the shielding plate to the second support using an elastic force.

17. The cooking apparatus of claim 16, wherein:
the elastic coupling member includes a first clamp and a second clamp formed to face each other to surround the shielding plate and the second support; and
the first clamp and the second clamp are elastically biased in a closing direction.

18. The cooking apparatus of claim 13, wherein the door includes:
a rear panel coupled to a rear portion of the door frame; and
an auxiliary glass member disposed behind the shielding plate.

* * * * *